(12) United States Patent
Hong et al.

(10) Patent No.: US 7,537,486 B2
(45) Date of Patent: May 26, 2009

(54) CARD CONNECTOR

(75) Inventors: Fan Shin Hong, Singapore (SG); Weng Heng Liong, Singapore (SG); Shao Yenn Florence, Singapore (SG)

(73) Assignee: MEA Technologies Pte. Ltd., Singapore (SG)

( * ) Notice: Subject to any disclaimer, the term of this patent is extended or adjusted under 35 U.S.C. 154(b) by 0 days.

(21) Appl. No.: 12/155,499

(22) Filed: Jun. 5, 2008

(65) Prior Publication Data

US 2008/0305685 A1 Dec. 11, 2008

(30) Foreign Application Priority Data

Jun. 8, 2007 (SG) ............................. 200704177-5

(51) Int. Cl.
*H01R 24/00* (2006.01)
(52) U.S. Cl. .................... 439/626; 439/153; 439/331; 439/377; 439/607; 439/188
(58) Field of Classification Search .................. 439/64, 439/153, 188, 260, 325, 326, 329, 331, 377, 439/607, 626, 629, 630
See application file for complete search history.

(56) References Cited

U.S. PATENT DOCUMENTS

| | | | | |
|---|---|---|---|---|
| 5,877,488 A * | 3/1999 | Klatt et al. | .................. | 235/486 |
| 6,062,889 A * | 5/2000 | Hyland et al. | ................ | 439/326 |
| 6,471,550 B2 * | 10/2002 | Maiterth et al. | ............. | 439/631 |
| 6,602,096 B1 * | 8/2003 | Kronestedt et al. | .......... | 439/630 |
| 6,642,614 B1 | 11/2003 | Chen | | |
| 6,869,302 B2 * | 3/2005 | Bricaud et al. | .............. | 439/326 |
| 7,029,306 B2 * | 4/2006 | Bilcauu et al. | .............. | 439/326 |
| 7,435,119 B2 * | 10/2008 | Chang et al. | ................ | 439/188 |
| 2004/0161965 A1 * | 8/2004 | Bricaud et al. | ............. | 439/489 |
| 2008/0305665 A1 * | 12/2008 | Hong et al. | ................. | 439/153 |
| 2008/0305669 A1 * | 12/2008 | Hong et al. | ................. | 439/329 |
| 2008/0305685 A1 * | 12/2008 | Hong et al. | ................. | 439/626 |

FOREIGN PATENT DOCUMENTS

JP 2003-197296 A 7/2003

* cited by examiner

*Primary Examiner*—James Harvey
(74) *Attorney, Agent, or Firm*—Rader, Fishman & Grauer, PLLC

(57) ABSTRACT

A card connector has: a connector housing 2 constituted of electrically insulating bodies in which is formed a bottomed card holding cavity that is open at the front and top and is enclosed on three sides by a pair of first and frames and by a third frame that links one pair of end portions of the first and second frames; contact terminals 5 and 6 deployed inside the connector housing's card holding cavity; and an open-close cover 3 that covers the openings of the connector housing's card holding cavity. The rear of the open-close cover is rotatably pivoted on the first and second frames. Thanks to such structure, the interior of the card holding cavity can be examined when a card is installed, so that a card connector is provided in which cards of differing size and thickness, etc., can be installed reliably and in a simple manner.

13 Claims, 13 Drawing Sheets

(B1)

(B2)

(B3)

CARD CONNECTOR

BACKGROUND

1. Technical Field

The present invention relates to a card connector that is installed and used in various electronic equipment such as personal computers and portable terminals. More particularly, the invention relates to a card connector into which small-size cards such as memory cards of differing outer-dimension size and thickness can be inserted.

2. Related Art

Installed in various electronic equipment such as personal computers and portable terminals, card connectors have been used for insertion of small-size cards, etc., with built-in CPU or memory IC, etc., such as micro MMCs (multi media cards) or micro SD (super density) cards, so as to expand the capabilities of such equipment.

A typical example of such a card connector is set forth in JP-A-2003-197296. This card connector has a connector housing with a card insertion aperture at the front and a card holding cavity inside, and multiple contact terminals that are fitted in the inner part of the card holding cavity; the structure is such that two card types of differing size and thickness can be inserted through the insertion aperture. Also, a card sensing switch is provided in the housing, and the installation status of each card type can be sensed.

Another typical example of a card connector is set forth in U.S. Pat. No. 6,642,614. This connector has a connector housing provided with a card holding cavity whose front and top are open; multiple contact terminals that are fitted in the inner part of the card holding cavity; and a covering that covers the top opening of the connector housing; the structure is such that two card types of differing size and thickness can be inserted through the front opening.

According to these connectors, an insertion aperture is formed in the front of the connector housing, two card types of differing size and thickness can be inserted through the insertion aperture, and the cards' contacts are electrically connected to the connector's contact terminals.

However, with each of these card connectors, when assembled it is not possible to examine the internal structure of the card holding cavity, such as the shape of the holding cavity and the contact terminal array status, through the insertion aperture. Hence, a user inserting a card into the insertion aperture will consult the written instructions or procedure, etc., printed on the card and insert the card into the insertion aperture in accordance with such instructions. But such consultation operation is troublesome and annoying, so that sometimes the card will be inserted without performing such consultation; if such insertion is stopped mid-way, the card will be pulled out from the insertion aperture so as to invert its directional or obverse-reverse face orientation, then reinserted for another try. Failure to effect adequate connection via such insertion will entail a further insertion operation with the card turned the other way around, etc. Such connection work will be troublesome and annoying, and what is more, forcibly carrying out such inappropriate insertion could damage or break either the connector or the card. Concerning this, the connector set forth in JP-A-2003-197296 is provided with a sensing switch that senses the card installation status, and is therefore able to sense adequate installation status. But the above trial-and-error connection operations will still have to be carried out until adequate installation is effected, which means that the above problems will remain. Also, the card connector set forth in U.S. Pat. No. 6,642,614, although facilitating formation of the card holding cavity by having the top opening covered by a covering, has the same problems in the assembled state, because the covering is joined to the connector housing by means of bonding agent or the like.

Also, these card connectors are common connectors that are used with cards of differing thickness, which means that the distance between the contacts of the various cards and the connector's contact terminals will vary with the difference in thickness. As a result, when the resilience of the contact terminals has been adjusted to match a thick card, it will not be possible to impart the requisite resilience to the contact terminals with a thin card; and conversely, when the resilience of the contact terminals has been adjusted to match a thin card, then with a thick card the contact terminals will be excessively displaced, exceed their stress limit, and undergo plastic deformation.

Further, where not only the thickness but also the size, that is, the outer dimensions of the cards differs, the card holding cavity is formed to a size that matches large-sized, thick cards. Consequently, when a small-sized, thin card is housed in the card holding cavity, which is suited for a large-sized card, gaps equivalent to the differences in the size and thickness of the two card types will occur inside the card holding cavity. Because of this, the small-sized, thin card will be housed in an unstable condition inside the card holding cavity, and will move readily if some impact acts on the connector, possibly resulting in poor connection between the card and connector, and hence in failure.

SUMMARY

An advantage of some aspects of the present invention is to provide a card connector which permits the interior of the card holding cavity to be examined when a card is housed therein, and into which cards of differing size and thickness can be installed reliably and in a simple manner.

Another advantage is to provide a card connector in which poor contacting will not occur even though a small-sized card is installed instead of a large-sized one.

An advantage of further aspects of the invention is provide a card connector which eliminates misinstallation of cards.

A card connector of the present invention includes: a connector housing constituted of electrical insulators and capable of housing cards of differing size and thickness inside a bottomed card holding cavity which is formed therein so as to be enclosed on three sides by an opposed pair of first and second frames and a third frame that links the end portions of the first and second frames, and so as to be open at the front and top; contact terminals that are deposed inside the connector housing's card holding cavity; and an open-close cover that covers the open portions of the connector housing's card holding cavity. The card connector has the feature that the rear of the open-close cover is rotatably pivoted on the first and second frames.

The open-close cover may have a sensing member for sensing the installation status of a first or second card type installed in the card holding cavity; the installation status of a first or second card type, when installed into the card holding cavity, will be sensed by closing the open-close cover and positioning the sensing member of the open-close cover at the rear end portion of the first or second card type.

The cards may include first and second card types, the first card type being formed small compared to the second card type, and a guide member being fitted to the first card type in order to install the first card type into the card holding cavity.

The cards may include first and second card types, the card holding cavity being formed in a shape that permits each of the first and second card types to be housed therein, and the contact terminals include first and second contact terminals that contact with the contacts of the first and second card types respectively.

Such first contact terminals may be fixed to the third frame of the connector housing, and such second contact terminals be fixed to the bottom of the connector housing.

The open-close cover may be formed from metal plates including a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member.

Either the first or the second frame of the connector housing may be provided with a first switch means that senses the installation status of the card, and with a second switch means that senses the open-closed status of the open-close cover.

Such first switch means may be composed of a first fixed contact terminal having a fixed contact, and a first movable contact terminal having a movable contact that contacts and separates from the fixed contact, together with an actuating part that separates the movable contact from the fixed contact when a card is installed; and such second switch means may be composed of a second fixed contact terminal having a fixed contact, and a second movable contact terminal having a movable contact that contacts and separates from the fixed contact, together with an actuating protrusion that separates the movable contact from the fixed contact in interlock with opening/closing manipulation of the open-close cover.

The actuating protrusion of such second movable contact terminal may, in interlock with closing manipulation of the open-close cover, cause the second switch means to execute a series of OFF-ON-OFF operations; in the final OFF state, the actuating protrusion will be latched into a latching hole provided in the frame, thereby locking the open-close cover in the closed state.

The cards may include first and second card types, the first card type being formed long compared to the second card type, and an aperture portion for insertion of the leading end of the first card type being formed in the third frame; so that when a first card type is installed, the leading end of the first card type will be inserted into such aperture and thereby be positioned and secured.

The aforementioned guide members may be formed with a top plate that covers the obverse surface of the leading end portion of such first card type, leaving a part thereof exposed, and with clasps and guide edgings that are bent out from the two side edges of the top plate and clasp the two side edges of the first card type.

In the guide member there may be formed, in a place adjacent to either of the clasps provided on the top plate, a controlling portion that controls the installation orientation of the first card type.

A shield cover made of metal may be fitted onto the rear of the connector housing, the open-close cover may be formed from metal material, and such metallic open-close cover may be pivoted on the shield cover.

In the guide member, on the upper surface of the top plate, there may be formed a raised portion that, in concert with the shield cover, reinforces the contacting with the second contact terminals.

Thanks to the above structures, the present invention yields the excellent advantages that will now be described. According to some aspects of the invention, the open-close cover of a card connector is opened when a card is installed, so that, in this opened state, the interior of the card holding cavity can be examined. Thus, when a card is installed, it is possible to check the shape of the card being installed and the position of the contacts thereof with the shape of the card holding cavity and the contact terminal array, and to install the card after such checking, so that the card can be installed in a simple, reliable manner, with misinstallations eliminated.

Also, in a preferred mode of the invention, the open-close cover is provided with a sensing member, and when a card is installed, should the card being installed not be inserted up to the regular position, the sensing member will strike against the trailing end portion of the card so that closing of the cover will not be possible, and incomplete connection of the connector and card will thereby be eliminated.

In another preferred mode of the invention, when a relatively small first card type is installed into the card holding cavity, the first card type will be held in a stable condition inside the card holding cavity, thanks to a guide member being fitted to the first card type before installation thereof. Thus, if for example the width and thickness of the second card type are large compared to those of the first card type, and the card holding cavity is formed to match the second card type, gaps equivalent to the differences between the first and second cards will occur inside the card holding cavity when a first card type is installed in the card holding cavity; but by attaching a guide member to the first card type before installation thereof, the gap will be closed by the guide member, so that the first card type is held in a stable condition.

According to another preferred mode of the invention, the card holding cavity is formed in a shape that can hold first and second card types of differing size and thickness, such as micro SD cards and micro MM cards or the like, and moreover, first and second contact terminals for contacting with the contacts of the first and second card types respectively are installed inside the card holding cavity, so that the card connector can be used as a common connector for multiple card types of differing size and thickness.

According to another preferred mode of the invention, the open-close cover is formed from metal plates including a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member; thanks to which, the open-close cover can be manufactured in a simple manner, by punching out plate metal of the requisite thickness and performing metal plate processing thereon. Since the front cover plate serves as the sensing member and the front opening of the card holding cavity will be covered over when the open-close cover is close, entry of dust or the like into the card holding cavity interior will be prevented, and a stable connected state can be maintained. What is more, because it is formed of metal plates, the open-close cover will, when installed to the connector housing, electromagnetically shield the connector.

According to another preferred mode of the invention, thanks to a first switch means, whether or not a card has been installed in the regular state can be sensed in a simple manner, and thanks to a second switch means, the open/closed status of the open-close cover can be sensed; as a result, it is possible to proactively prevent incomplete installation of the card and incomplete closing of the open-close cover.

According to another preferred mode of the invention, thanks to a second switch means, the open/closed status of the open-close cover can be sensed, and moreover, the open-close cover can be locked.

According to another preferred mode of the invention, when a first card type is installed, the leading end of the first card type will be inserted into an aperture portion formed in the third frame and thereby be positioned and secured. Thus, since the first card type will be positioned via positioning by the guide member, as well as via insertion into this aperture portion, the card will be accurately positioned and secured inside the card holding cavity.

According to another preferred mode of the invention, the guide member is formed with a top plate that covers the obverse surface of the leading end portion of the first card type, leaving a part thereof exposed, and with clasps and guide edgings that are bent out from the two side edges of the top plate and clasp the two side edges of the card. This means that the guide member can be manufactured in a simple manner, by punching and bending processing of plate metal. Also, since the first card type is clasped by the clasps, the guide member will not drop off from the first card type.

According to another preferred mode of the invention, the guide member is provided with a controlling portion, by means of which, wrongly-orientated installation of the first card type is prevented.

According to another preferred mode of the invention, the connector housing is covered by a metallic shield cover and open-close cover, so that the connector is electromagnetically shielded in a simple manner. Further, by pivoting the open-close cover on the shield cover, assembly of the connector is rendered simple.

According to another preferred mode of the invention, the guide member is provided with a raised portion, which, in concert with the shield cover, maintains good contacting between the card's contacts and the second contact terminals, when a card is installed.

BRIEF DESCRIPTION OF THE DRAWINGS

The invention will be described with reference to the accompanying drawings, wherein like numerals reference like elements.

DESCRIPTION OF EXEMPLARY EMBODIMENT

An exemplary embodiment of the present invention will now be described with reference to the accompanying drawings. It should be borne in mind however, that the following embodiment is merely an example of a card connector that realizes the technical concepts of the invention. The embodiment is not intended to limit the invention to this particular card connector. The invention can equally well be adapted to yield other embodiments contained within the scope of the claims.

First Embodiment

Figure 1:
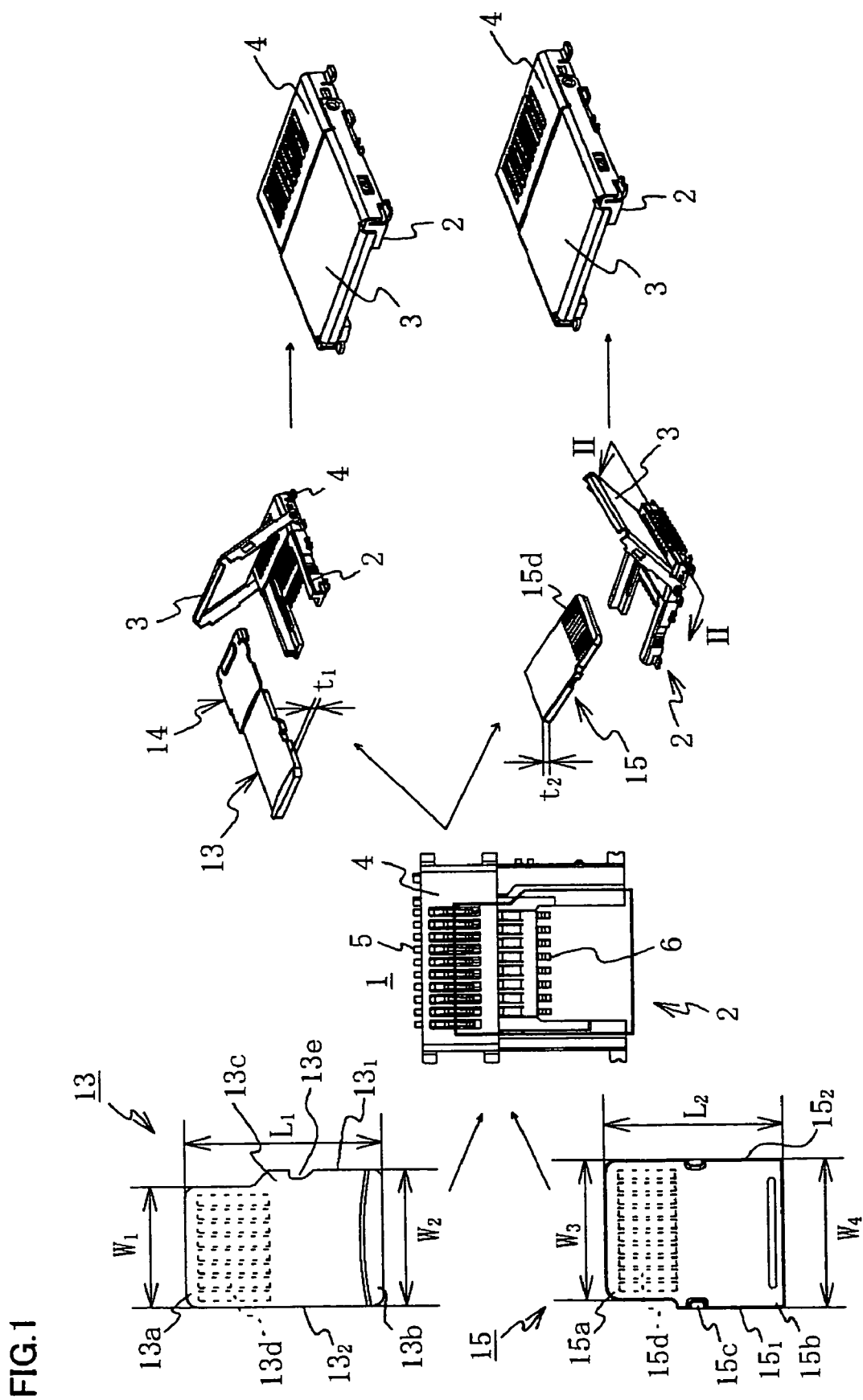
FIG. 1 is a general view of a card connector of an embodiment of the present invention, illustrating the mode of use thereof.
Figure 2:
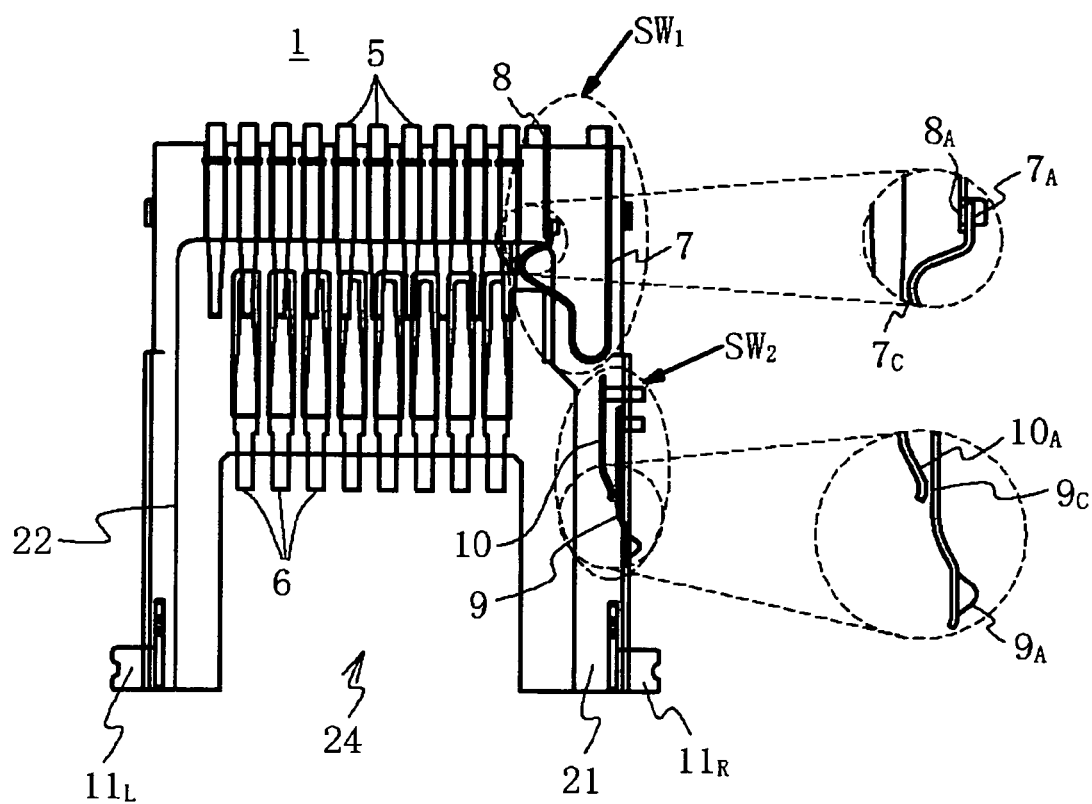
FIG. 2 is a cross-sectional view of the card connector in FIG. 1, along line II-II therein.

As shown in FIG. 1, a card connector (below, "connector") 1 is used with two types of card, a first type and a second type, that differ slightly in size and thickness, for instance a micro SD (super density) card 13 and a MM (multi media) card 15. Accordingly, outline descriptions of these cards will first be given.

The micro SD card 13 includes a rectangular plate-like body having longitudinal length $L_1$, widths $W_1$ and $W_2$ at the forward and rear end portions 13a and 13b ($W_1<W_2$), and thickness $t_1$. The interior thereof contains an IC chip, while the outer periphery is formed from a molding of electrically insulative synthetic resin. On one of the side edges (the first side edge) $13_1$ of this micro SD card 13 there are provided a positioning protrusion 13c and a latching indent 13e, while the other side edge $13_2$ is a straight line. On the obverse face of the micro SD card 13 there are provided multiple contacts 13d that are connected to the IC chip in the interior.

The micro MM card 15 has almost the same shape as the micro SD card 13, including a molding having longitudinal length $L_2$, widths $W_3$ and $W_4$ at the forward and rear end portions 15a and 15b ($W_3<W_4$), and thickness $t_2$. The micro MM card 15 too has a positioning protrusion 15c provided in one of the side edges (the first side edge) $15_1$, the other side edge (the second side edge) $15_2$ being a straight line, and has multiple contacts 15d provided on its obverse face. Moreover, the contacts 13d, 15d are provided on the reverse sides of the cards 13, 15 shown in FIG. 1, being indicated by dashed lines therein. The relations between the widths, lengths and thicknesses of these micro SD and micro MM cards 13, 15 are: $W_3>W_1$, $L_1>L_2$, and $t_2>t_1$.

The connector 1 has: a connector housing (below, the "housing") 2 with a card holding cavity 24 in which the micro SD or micro MM card 13, 15 are installed; first and second contact terminals 5, 6 that are housed in the housing 2 and are electrically connected to the contacts 13d, 15d of the respective card; and an open-close cover 3 and shield cover 4 which are mounted on top of the housing 2. For installation of the micro SD card 13 into the connector 1, a guide member 14 is fitted to the micro SD card 13.

There follow descriptions of the structures of the housing 2, the open-close cover 3, the shield cover 4, and the first and second contact terminals 5, 6.

FIGS. 3 and 4 give perspective views of the housing 2 seen from different angles, to facilitate comprehension of the structure of the housing 2. The housing 2 is formed as an electrically insulative synthetic resin molding, which is surrounded by an opposed pair of first and second frames 21, 22 and a third frame that links the end portions of the first and second frames 21, 22, and which has a shallow-bottomed card holding cavity 24 that is open on three sides—the front, the top, and part of the bottom. The upper surface of the housing 2 is partitioned, part-way along from the front end toward the rear, into two: an open-close cover mounting part i toward the front, that is covered by the open-close cover 3, and a shield cover mounting part ii toward the rear, where the shield cover 4 is mounted.

The pair of first and second frames 21, 22 are provided so as to have a spacing therebetween slightly larger than the larger width $W_4$ of the micro MM card 15, have a length slightly longer than the length $L_1$ of the longer micro SD card 13, and are formed as square pillar-like bodies of a particular thickness. More precisely, as shown in FIGS. 3B and 4A, the first frame 21 is formed as a square-pillar body having obverse and reverse wall faces $21_A$, $21_B$ and inner and outer wall faces $21_C$, $21_D$. Likewise, the second frame 22 is formed as a square-pillar body having obverse and reverse wall faces $22_A$, $22_B$ and inner and outer wall faces $22_C$, $22_D$. Further, the third frame 23 too is formed as a square-pillar body of a particular thickness, which has obverse and reverse wall faces $23_A$, $23_B$ and inner and outer wall faces $23_C$, $23_D$.

Figure 3A:
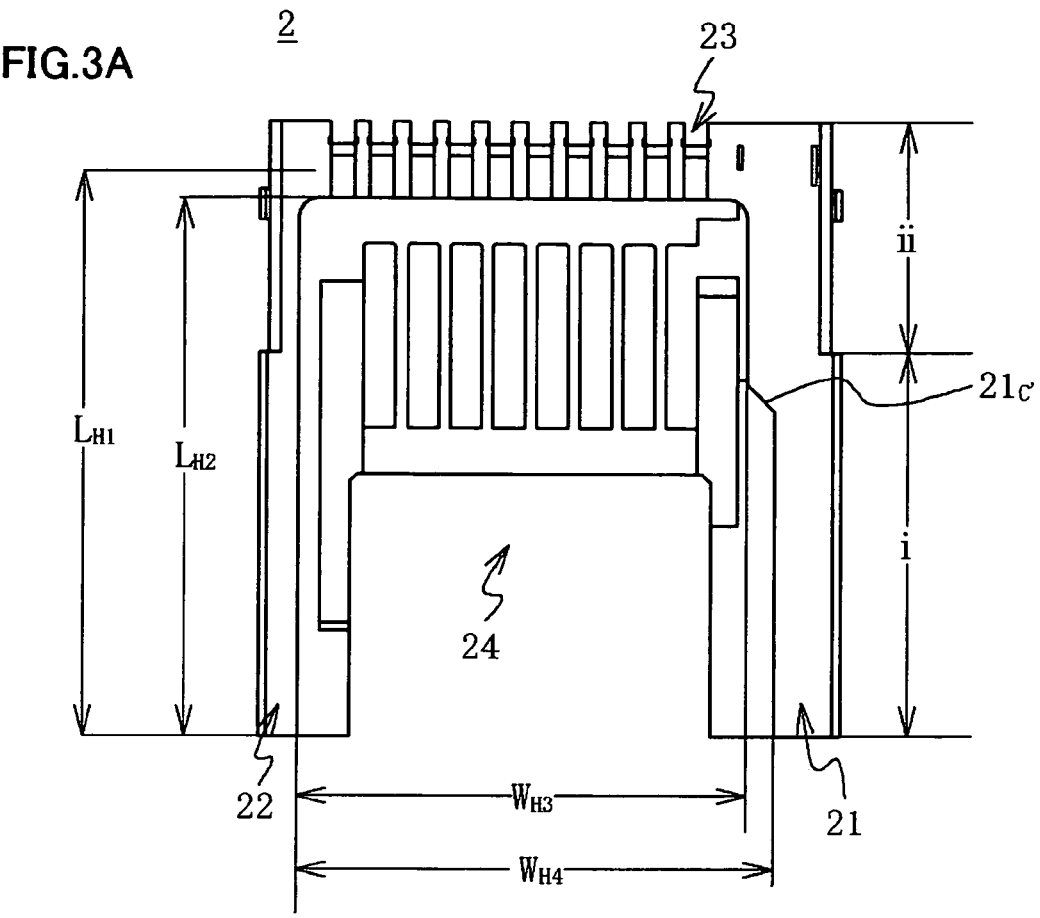
FIG. 3 illustrates the connector housing, FIG. 3A being a plan view, and FIG. 3B a perspective view.
Figure 3B:
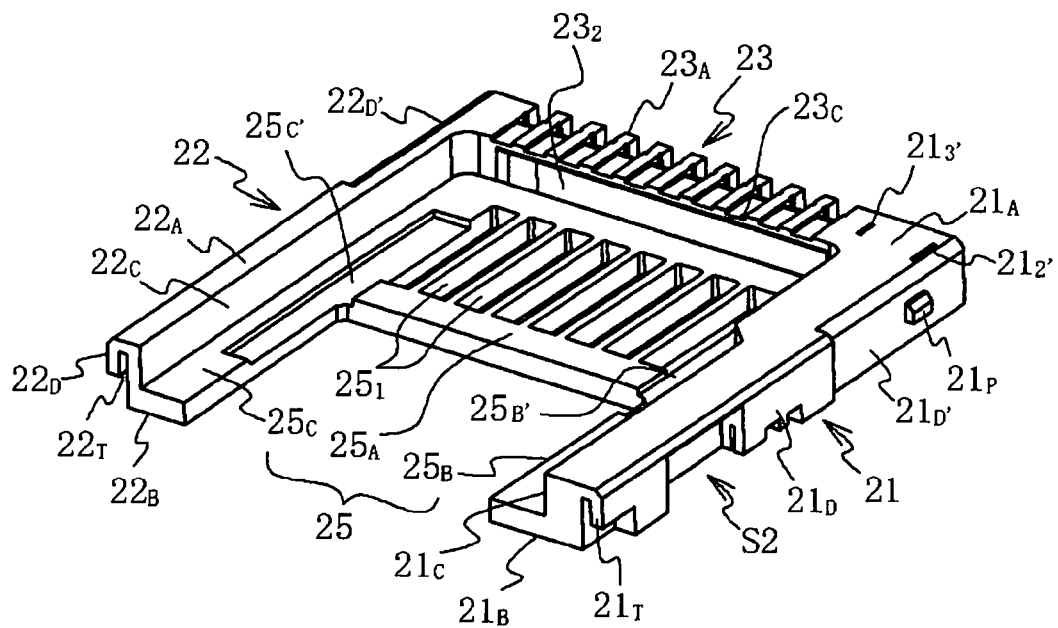
Figure 4A:
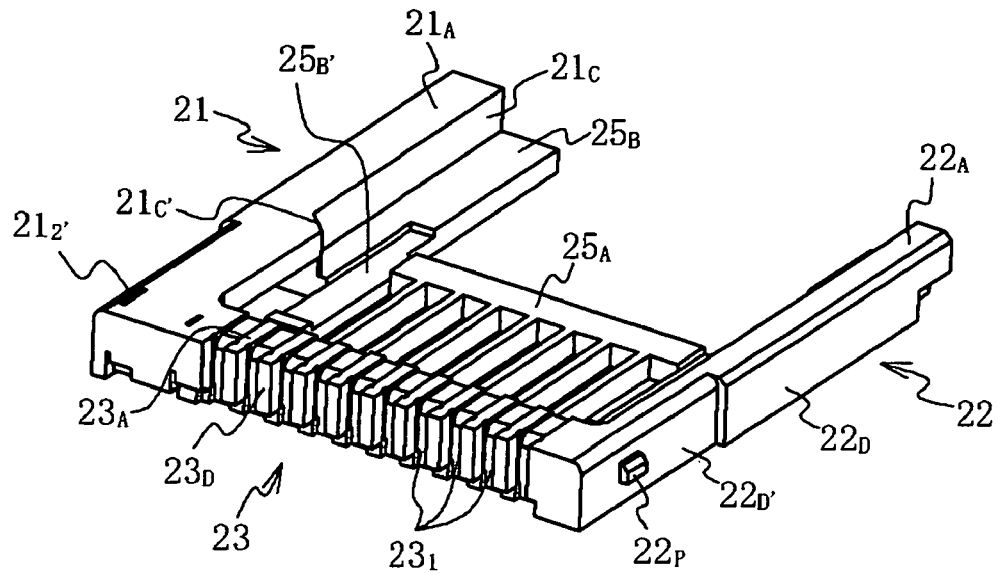
FIG. 4 illustrates the connector housing, FIG. 4A being a perspective view of the housing in FIG. 3B from another angle, and FIG. 4B being a rear view.
Figure 4B:
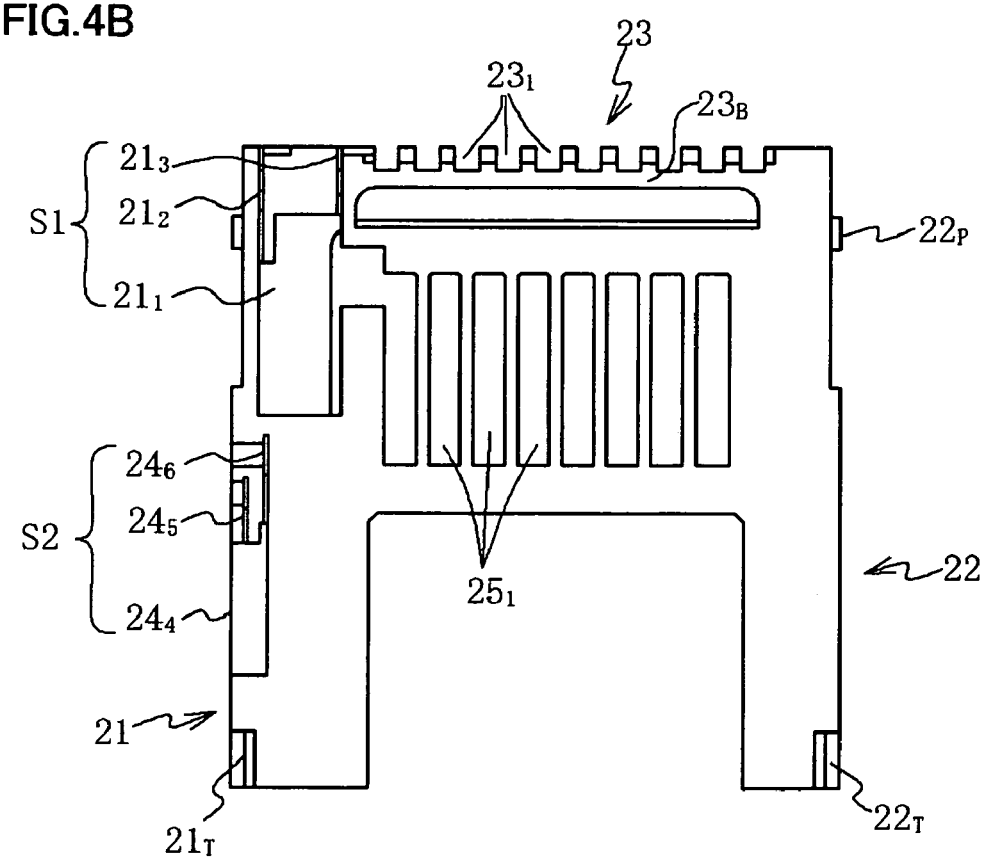

The first frame 21 is a little thicker than the second frame 22, and as shown in FIGS. 3B and 4B, is provided with first and second switch mounting portions S1, S2 at two locations, toward the front and the rear. A switch member for sensing the installation status of the micro SD and micro MM cards 13, 15 is fitted into the first switch mounting portion S1, and a switch member for sensing the open-closed status of the open-close cover 3 is fitted into the second switch mounting portion S2.

The first switch mounting portion S1 is composed, as shown in FIG. 4B, of a square-bottomed depression $21_1$ that is cut out, at a particular depth, from the reverse wall face $21_B$ toward the obverse wall face $21_A$ of the first frame 21; and two mounting slots $21_2$, $21_3$ that communicate with the square-bottomed depression $21_1$, these being provided in the vicinity of the third frame 23. The mounting slot $21_2$ is formed in the reverse wall face $21_B$ of the first frame 21, and has a width that allows insertion of a movable contact terminal 7 to be described later. In the obverse wall face $21_A$ of the first frame 21 there is formed an insertion slot $21_{2'}$ into which the fitting tab $7_E$ of the movable contact terminal 7 is inserted (see FIG. 4A). Also, the mounting slot $21_3$ is formed in the reverse wall face $21_B$ of the first frame 21 and has a width that allows insertion of a fixed contact terminal 8 to be described later.

The second switch mounting portion S2 is formed, as shown in FIG. 4B, with a square-bottomed depression $21_4$ that sinks to a particular depth from the outer wall face $21_D$ of the first frame 21; and two mounting slots $21_5$, $21_6$ that communicate with the square-bottomed depression $21_4$. A switch member for sensing the open/closed status of the open-close cover 3 is fitted into the second switch mounting portion S2. Further, the front portion of the outer wall face $21_D$ of the first frame 21 bulges outward, while the rear portion thereof that is close to the third frame 23 includes a flat surface $21_{D'}$ that lies beyond a step difference, being recessed relative to the front portion, and in such flat surface $21_{D'}$ there is formed a latching protrusion $21_P$ onto which the shield cover 4 latches.

As shown in FIGS. 3A and 3B, there is a particular width dimension $W_{H4}$ between the front portion of the inner wall face $21_C$ of the first frame 21 and the inner wall face $22_C$ of the second frame 22, which is opposed to the inner wall face $21_C$. Near to the first switch mounting portion S1 there is formed an inclined face $21_{C'}$, and the portion to the rear of such inclined face $21_{C'}$ (that is, the inmost portion) projects into the card holding cavity 24, so that at the inmost portion the distance between the inner wall face $21_C$ and the inner wall face $22_C$ of the second frame 22 is contracted, becoming width dimension $W_{H3}$. If the micro SD or micro MM card 13 or 15 is installed wrongly, the positioning protrusion 13c or 15c of the micro SD or micro MM card 13 or 15 will strike against the inclined face $21_{C'}$, blocking any further pushing-in of the card, so that wrong installation is prevented. Conversely, when the micro SD or micro MM card 13 or 15 is installed correctly, the inclined face $21_{C'}$ will serve as a guide surface that renders the pushing-in smooth. In the front portion of the reverse wall face $21_B$ of the first frame 21 there is formed a mounting slot $21_T$ into which a fitting tab is fitted.

As shown in FIG. 3B, the front portion of the outer wall face $22_D$ of the second frame 22 bulges outward, while the rear portion thereof that is close to the third frame 23 includes a flat surface $22_{D'}$ that lies beyond a step difference, being recessed relative to the front portion, and in such flat surface $22_{D'}$ there is formed a latching protrusion $22_P$ onto which the shield cover 4 latches. In the front portion of the outer wall face $22_D$ of there is formed a mounting slot $22_T$ into which a fitting tab fits.

In the obverse wall face $23_A$ and outer wall face $23_D$ of the third frame 23 there are formed, with roughly equal spacings, multiple mounting slots $23_1$ of a width that allows installation of the first contact terminals 5, as shown in FIG. 4A. Also, in the inner wall face $23_C$ there is formed an aperture $23_2$ of a size that allows insertion of the leading end portion 13a of the narrow micro SD card 13 (see FIG. 3B). More precisely, so as to be of a size that allows the leading end portion 13a of the micro SD card 13 to be inserted, the aperture $23_2$ is formed with a longitudinal dimension a little larger than the width $W_1$ of the micro SD card 13 and with a height a little larger than the thickness $t_1$ of the micro SD card 13, so that when the leading end portion 13a of the micro SD card 13 is inserted into the aperture, positioning and securing of the micro SD card 13 is effected.

As shown in FIGS. 3 and 4A, the first and second frames 21, 22 are coupled via a bottom plate 25 extending from the third frame 23 toward the front portions of the first and second frames 21, 22. More precisely, the reverse wall faces $21_B$, $22_B$ of the first and second frames 21, 22 are coupled via a bottom plate 25 of a particular thickness. This bottom plate 25 is formed as an inner bottom plate $25_A$ that couples the two frames 21, 22, plus lateral bottom plates $25_B$, $25_C$ that are drawn out from the inner bottom plate $25_A$ and divided along the first and second frames 21, 22. In the inner bottom plate $25_A$ there are formed, with roughly equal spacings, multiple mounting slots $25_1$ into which the second contact terminals 6 are installed. At points adjacent to the first and second frames 21, 22 there are formed shallow guide grooves $25_{B'}$, $25_{C'}$ into which the clasps $14_B$, $14_D$ of the guide member 14 to be described later fit and which guide the motion thereof (see FIGS. 3B and 4A).

Thus, the card holding cavity 24 is formed by being surrounded on three sides by the first and second frames 21, 22 plus the third frame 23. As shown in FIG. 3A, the distance $W_{H4}$ between the inner wall faces $21_C$, $22_C$ of the first and second frames 21, 22, and the distance $W_{H3}$ between the inner wall face $22_C$ and the inclined face $21_{C'}$, are formed to be a little larger than the widths $W_4$, $W_3$ of the micro MM card 15, so that the broad micro MM card 15 can be inserted. Also, the length $L_{H1}$ from the leading end portion to the interior of the aperture $23_2$ is formed to be almost equal to the length $L_1$ of the micro SD card 13, so that the micro SD card 13 can be inserted. Furthermore, the length $L_{H2}$ from the leading end portion to the inner wall face $23_C$ of the third frame 23 is formed to be almost equal to the length $L_2$ of the micro MM card 15.

Figure 5:
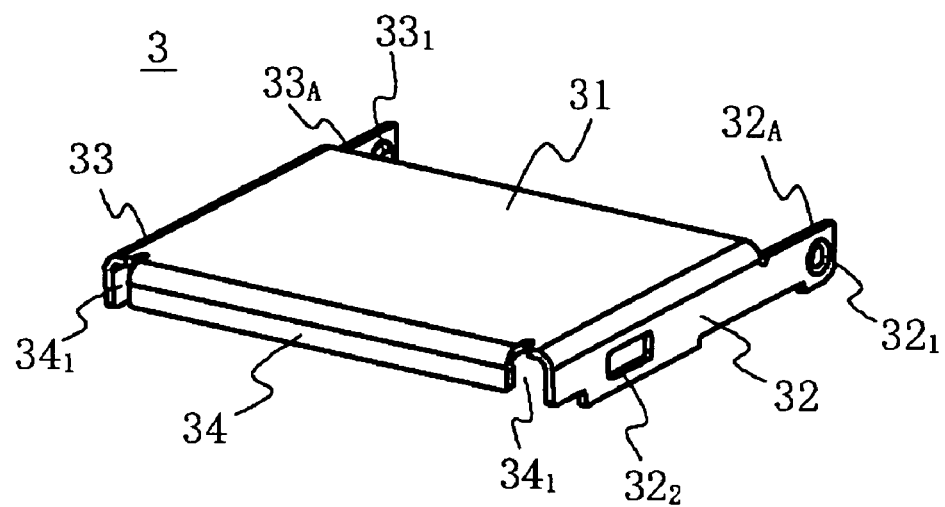
FIG. 5 is a perspective view of the open-close cover.

The open-close cover 3, which is for covering the card holding cavity 24 of the housing 2, has, as FIG. 5 shows, a top plate 31 that covers the top opening of the card holding cavity 24; a pair of sideplates 32, 33 that are bent downward from the two side edges of the top plate 31 and cover the side wall faces of the housing 2; and a front cover plate 34 that similarly is bent downward from the front edge of the top plate 31 and covers the front opening of the card holding cavity 24; and is formed via punching of metal plate and bending processing. The front cover plate 34 serves as a sensing member that senses inappropriate installation status of the cards. Gaps $34_1$, $34_1$ are formed between the two sideplates 32, 33 and the front cover plate 34. The pair of sideplates 32, 33 are extended a certain distance rearward, and on the ends of these extension portions $32_A$, $33_A$ there are provided pivot protrusions $32_1$, $33_1$ that each project toward the opposing sideplate surface. These extension portions $32_A$, $33_A$ possess resilience and, during installation of the open-close cover 3 to the housing 2, will press against and be clasped by the sideplates 42, 43 of the shield cover 4 that is fitted to the side wall faces of the housing 2.

Moreover, on one sideplate 32, near the front portion, there is formed an aperture $32_2$. This aperture $32_2$ is a latching hole of a size that allows insertion of the latching protrusion $9_A$ of the switch member 9. Being formed of metallic material, when installed to the housing 2 the open-close cover 3 will act as an electromagnetic shielding member that shields off external noise.

Figure 6:
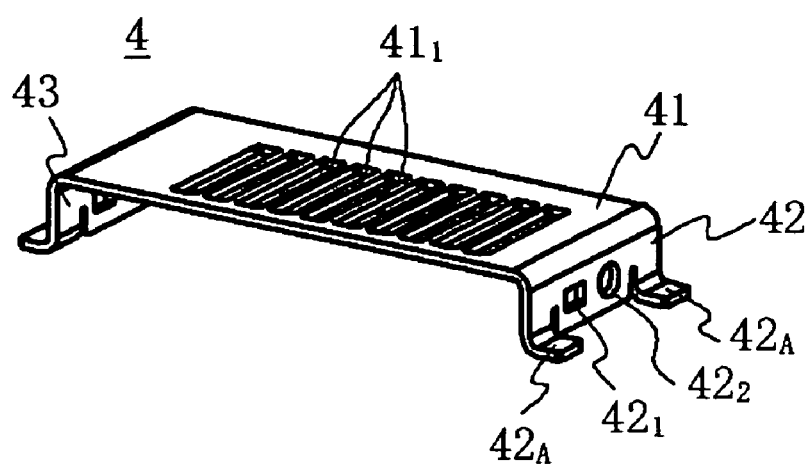
FIG. 6 is a perspective view of the shield cover.

The shield cover 4, which as FIG. 6 shows, is an item that is fitted to the shield cover mounting part ii of the housing 2, has a top plate 41 that covers over such mounting part, and a pair of sideplates 42, 43 that are bent downward from the two ends of the top plate 41; and is formed via punching of metal plate and bending processing. Multiple slits $41_1$ are formed with roughly equal spacings in the top plate 41. Such spacings correspond to the first contact terminals 5 that are installed in the housing 2, and the width of the slits $41_1$ is a dimension such that the first contact terminals 5 and the shield cover 4 will not contact.

Now the structure of the sideplates 42, 43 will be described. Since the sideplates 42, 43 have the same form, the form of one only, the sideplate 42, will be described. The sideplate 42 is provided with a latching hole $42_1$ into which the latching protrusion $21_P$ of the housing 2 latches, a pivoting hole $42_2$ in which the pivot protrusion $32_1$ of the open-close cover 3 pivots, and a pair of fitting tabs $42_A$, $42_A$ that fit into a circuit board such as a printed wiring board. Incidentally, the other sideplate 43 is also provided with a similar latching hole, pivoting hole and fitting tabs (omitted from the drawing). The sideplates 42, 43 possess resilience and, during installation to the housing 2, will press against and be clasped by the sidewall faces $21_D'$, $22_D'$ of the housing 2. Also, due to being formed from metallic material, when installed to the housing 2 the shield cover 4 will act as an electromagnetic shielding member that shields off external noise.

Figure 7A:
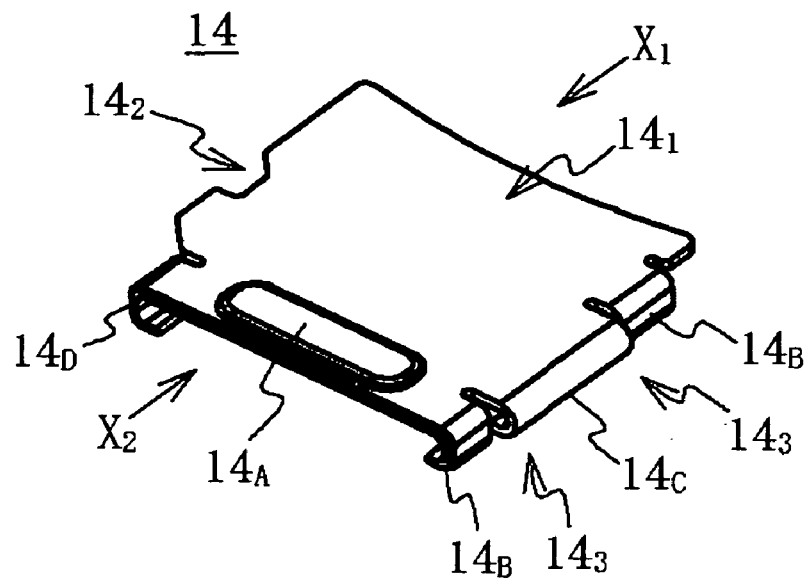
FIG. 7 illustrates the guide member, FIG. 7A being a perspective view, FIG. 7B being a perspective view of the guide member in FIG. A rotated 180 degrees, and FIG. 7C being a side view of the guide member in FIG. A seen from the direction $X_2$.
Figure 7B:
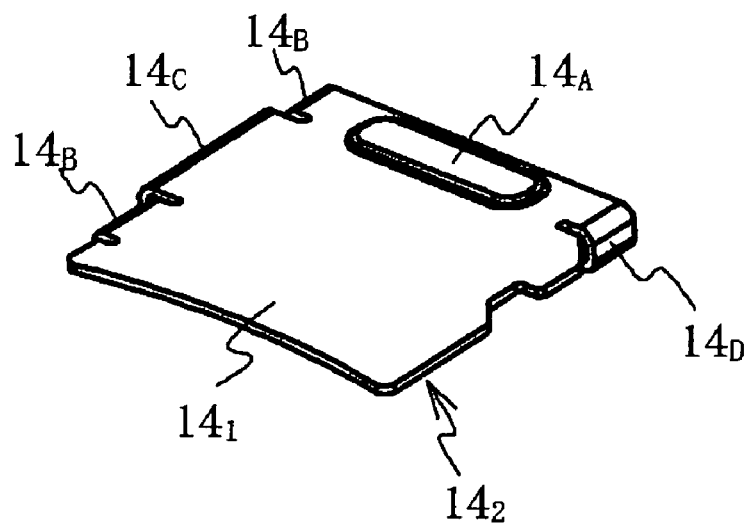
Figure 7C:
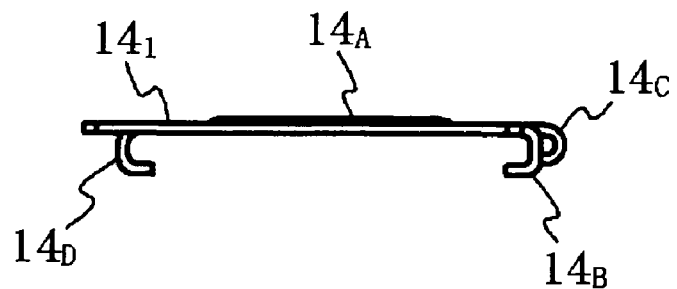

FIG. 7 illustrates a guide member; FIG. 7A is a perspective view, FIG. 7B is a perspective view of the guide member in FIG. 7A rotated 180 degrees, and FIG. 7C is a side view of the guide member in FIG. A from the direction $X_2$.

The card holding cavity 24 inside the housing 2 is formed to a size that matches the micro MM card 15, which is larger than the micro SD card 13. Therefore, when the micro SD card 13, which is thinner and narrower than the micro MM card 15, is inserted, gaps equivalent to the difference in thickness and width between the two cards 13, 15 occur around the micro SD card 13 inside the card holding cavity 24. Due to such gaps, the micro SD card 13 will be unstable inside the card holding cavity 24, and if vibration, etc., acts thereon, the micro SD card 13 will readily move inside the card holding cavity 24, which could result in faulty connection of the contacts. The guide member 14 is employed to avoid such adverse situation.

The guide member 14 has a top plate 141 of a size such as to cover the obverse face of the micro SD card 13 while leaving the leading end portion 13a of the micro SD card 13 exposed, and a pair of first and second sideplates $14_2$, $14_3$ that are bent downward from the two longitudinal side edges of the top plate $14_1$; and is formed via punching and bending processing of metal plate. In the front part of the top plate $14_1$ there is formed a raised portion $14_A$ including a part of the obverse face that is made to project upwards. When the micro SD card 13 is inserted into the card housing cavity 24, this raised portion $14_A$, in concert with the shield cover 4, performs the role of maintaining in good condition the electrical contacting between the contacts 13d of the micro SD card 13 and the second contact terminals 6. At the front of the first sideplate $14_2$ there is provided a clasp $14_D$. This clasp $14_D$ is formed in a hook shape by bending the end portion of the first sideplate $14_2$ over toward the second sideplate $14_3$, so that the micro SD card 13 will be caught therein.

The second sideplate $14_3$ is provided with a pair of clasps $14_B$, $14_B$, at the front and rear ends in the longitudinal direction, that will clasp one side edge of the micro SD card 13, and with a guide piece $14_C$ that is located between the clasps $14_B$, $14_B$. Each clasp $14_B$, $14_B$ is formed in a hook shape by bending the end portion of the second sideplate $14_3$ over toward the first sideplate $14_2$, so that the micro SD card 13 will be caught therein. The guide piece $14_C$ contacts against the inner wall face $22_C$ of the second frame 22 and performs the function of guiding insertion of the micro SD card 13, during insertion thereof into the card holding cavity 24. Slits will preferably be provided between each of the clasps $14_B$, $14_B$ and the guide piece $14_C$, in order to separate off the clasps $14_B$, $14_B$ and impart resilience thereto.

Thanks to the foregoing structure, the guide member 14 is able, by being fitted close to the leading end part 13a of the micro SD card 13 before the micro SD card 13 is installed into the connector 1, to prevent the micro SD card 13 from being installed into the card holding cavity 24 of the connector 1 in an inappropriate state. More precisely, with the micro SD card 13 in the state shown in FIG. 1, that is, with the contacts 13d located on the underside (reverse face) of the micro SD card 13, when the card is inserted into the guide member 14 from the direction $X_1$ shown in FIG. 7, the first side edge $13_1$ of the micro SD card 13 will be clasped by the clasp $14_D$, and the other side edge $13_2$ by the other clasps $14_B$, $14_B$, so that the micro SD card 13 will not fall out. Since this fitted state will produce correct installation, correct connection will be possible by installing the card in this state into the card holding cavity 24. Should it be attempted to insert the micro SD card 13 into the guide member 14 from the $X_2$ direction, the positioning protrusion $13_C$ will strike against the clasp $14_D$ or $14_B$, blocking the insertion, so that such fitting will not be possible. Also if it is attempted to insert the micro SD card 13 into the guide member 14 with the obverse/reverse faces inverted, insertion will likewise be blocked. Thus, misinstallation of the micro SD card 13 into the guide member 14 is prevented. The guide member 14 is formed from metal plate here, but could alternatively be formed as a molding of electrically insulative synthetic resin.

Figure 8A:
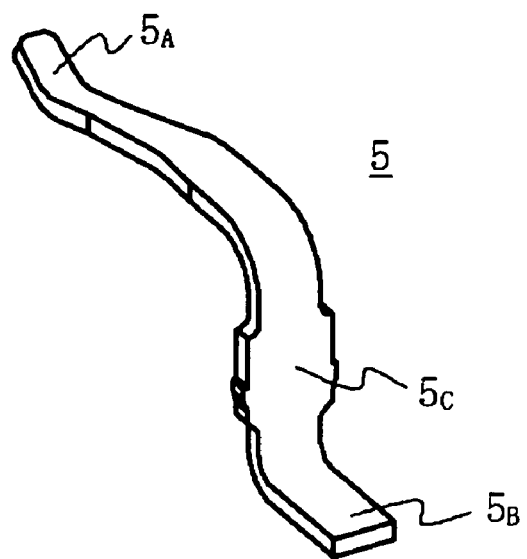
FIG. 8 illustrates a pair of contact terminals, FIG. 8A being a perspective view of a first contact terminal, and FIG. 8B being a perspective view of a second contact terminal.
Figure 8B:
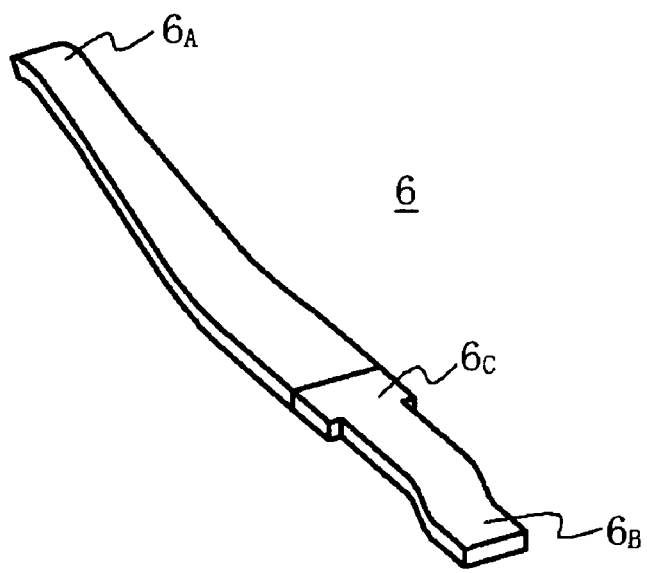

FIG. 8 shows the first and second contact terminals 5 and 6. The first contact terminal 5 has at one end a contact $5_A$ that contacts with the contacts 15$d$ of the micro MM card 15; at the other end a connecting portion $5_B$ that is connected by soldering to a lead wire; and, provided in the vicinity of the connecting portion $5_B$, a fixing portion $5_C$ for fixing to the housing 2; and is formed as a highly conductive, resilient strip-like metal piece of a particular width, length and thickness. The first contact terminal 5 is fitted to the third frame 23 of the housing 2, and electrically connected to the contacts 15$d$ of the micro MM card 15. The second contact terminal 6 has at one end a contact $6_A$ that is electrically connected to the contacts 13$d$ of the micro SD card 13; at the other end a connecting portion $6_B$ that is connected by soldering to a lead wire; and, provided in the vicinity of the connecting portion $6_B$, a fixing portion $6_C$ for fixing to the housing 2; and is formed as a highly conductive, resilient strip-like metal piece of a particular width, length and thickness. The second contact terminal 6 is fitted to the inner bottom plate $25_A$ of the housing 2, and connected to the contacts 13$d$ of the micro SD card 13.

Figure 9A:
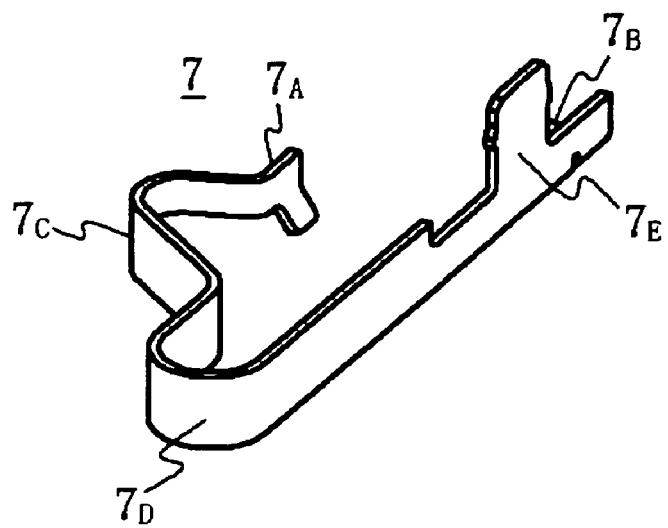
FIG. 9 illustrates a first switch member, FIG. 9A being a perspective view of a movable contact terminal, and FIG. 9B being a perspective view of a fixed contact terminal.
Figure 9B:
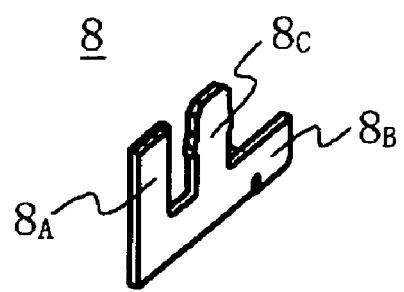

FIG. 9 shows the first switch member that constitutes the first switch means $SW_1$. This first switch means $SW_1$ is composed of a movable contact terminal 7 with a movable contact, and a fixed contact terminal 8 with a fixed contact. The movable contact terminal 7 has a movable contact $7_A$ provided at the front tip; a projecting curved portion $7_C$ that is provided at a point somewhat removed from such contact and contacts against the first side edge $13_1$ or $15_1$ of the card 13 or 15; a curved portion $7_D$ that imparts resilience to the movable contact $7_A$ and projecting curved portion $7_C$; a connecting portion $7_B$ that is provided at the rear tip and is connected by soldering to a lead wire; and, provided in the vicinity of the connecting portion $7_B$, a fitting tab $7_E$ that is fixed to the housing 2; and is formed as a highly conductive, resilient strip-like metal piece of a particular width, length and thickness. The projecting curved portion $7_C$ serves as the actuating part for the first switch means $SW_1$. The fixed contact terminal 8 has a fixed contact $8_A$ provided at the front tip; a connecting portion $8_B$ that is provided at the rear tip and is connected by soldering to a lead wire; and, provided in the vicinity of the connecting portion $8_B$, a fitting tab $8_C$ that is fixed to the housing 2; and is formed as a highly conductive, resilient strip-like metal piece of a particular width, length and thickness.

Figure 10A:
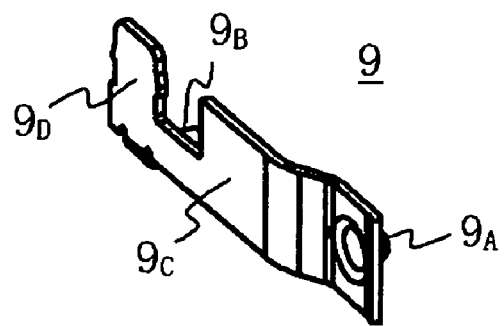
FIG. 10 illustrates a second switch member, FIG. 10A being a perspective view of a movable contact terminal, and FIG. 10B being a perspective view of a fixed contact terminal.
Figure 10B:
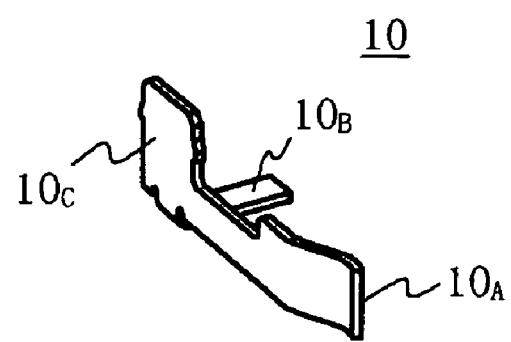

FIG. 10 shows the second switch member that constitutes the second switch means $SW_2$. This second switch means $SW_2$ is composed of a movable contact terminal 9 with a movable contact, and a fixed contact terminal 10 with a fixed contact. The movable contact terminal 9 has a latching protrusion $9_A$ provided at the front tip; a movable contact $9_C$ provided in the vicinity of the latching protrusion $9_A$; a connecting portion $9_B$ that is connected by soldering to a lead wire; and, provided in the vicinity of the connecting portion $9_B$, a fitting tab $9_D$ that is fixed to the housing 2; and is formed as a highly conductive, resilient strip-like metal piece of a particular width, length and thickness. The latching protrusion $9_A$ contacts against the inner face of the sideplate 32 of the open-close cover 3, and performs the function of causing the movable contact $9_C$ of the movable contact terminal 9 to contact with the fixed contact $10_A$ of the fixed contact terminal 10, as well as that of locking the open-close cover 3. The fixed contact terminal 10 has a fixed contact $10_A$ provided at the front tip; a connecting portion $10_C$ that is connected by soldering to a lead wire; and, provided in the vicinity of the connecting portion $10_C$, a fitting tab $10_B$ that is fixed to the housing 2; and is formed as a highly conductive, resilient strip-like metal piece of a particular width, length and thickness.

Figure 11A:
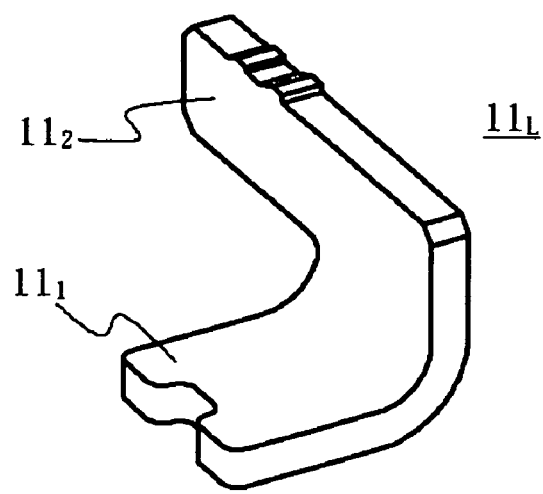
FIG. 11 illustrates fitting tabs, FIG. 11A being a perspective view of a left fitting tab, and FIG. 9B being a perspective view of a right fitting tab.
Figure 11B:
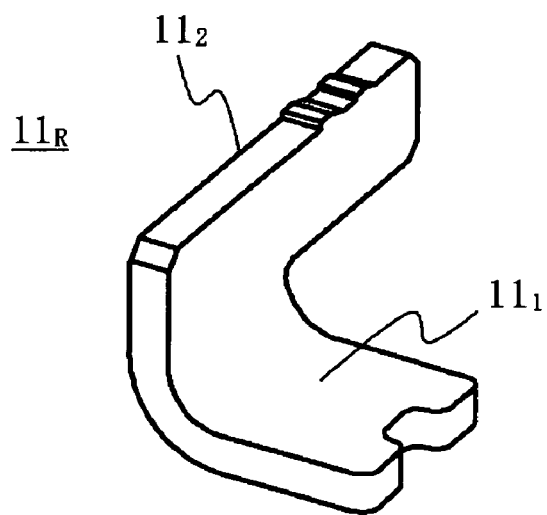

FIG. 11 shows a pair of fitting tabs. These fitting tabs includes a left and a right fitting tab, $11_L$ and $11_R$, are mounted to the bottom of the housing 2, and are for fixing the connector 1 to a circuit board such as a printed wiring board. The left fitting tab $11_L$ has a housing fixing portion $11_1$ that is inserted into installation holes in the housing 2, and a circuit board fixing portion $11_2$ that is drawn out from one end of the housing fixing portion $11_1$ and is fixed to the circuit board by solder; and is formed as an approximately L-shaped metallic piece. The other, right fitting tab $11_R$ likewise has a housing fixing portion $11_1$ and a circuit board fixing portion $11_2$. However, the left and right fitting tabs $11_L$, $11_R$ differ in the direction in which the circuit board fixing portion $11_2$ is drawn out relative to the housing fixing portion $11_1$.

Figure 12A:
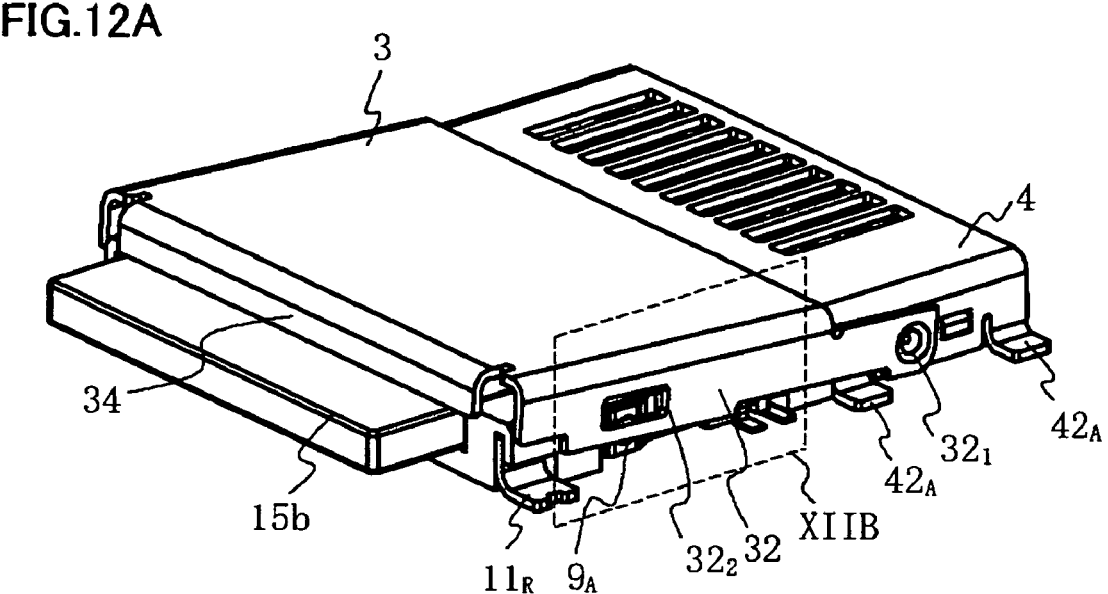
FIG. 12 explicates the closing manipulation of the open-close cover, FIG. 12A being a perspective view, and FIG. 12B being side views of portion XIIB in FIG. 11A.
Figure 12B:
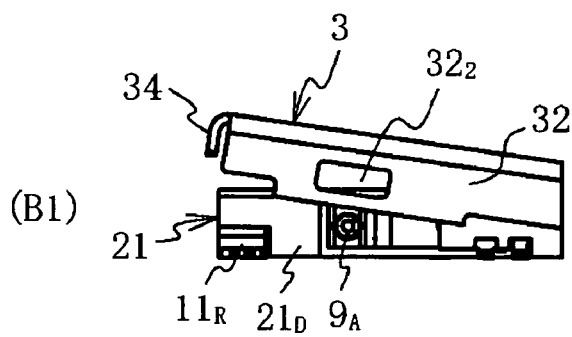
Figure 12B:
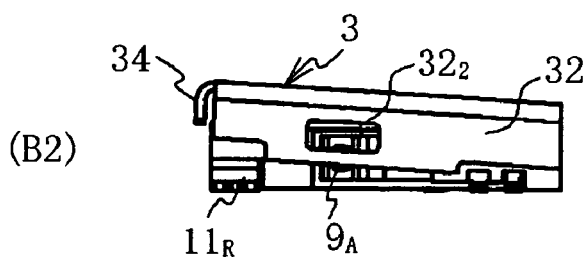
Figure 12B:
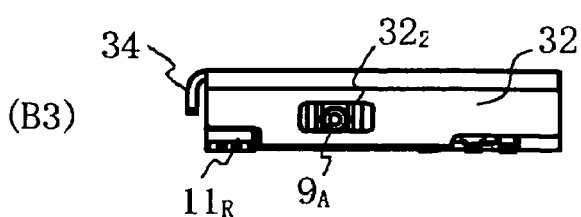
Figure 13A:
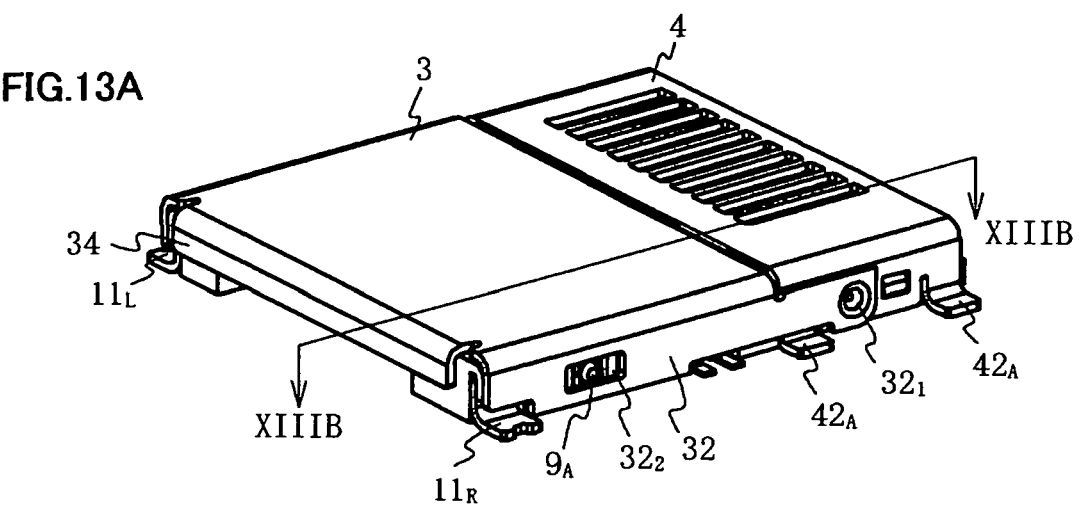
FIG. 13 illustrates the states in the installation of a card to the card connector, FIG. 13A being a perspective view, FIG. 13B being a cross-sectional view along line XIII-XIII in FIG. 13A, FIGS. 13C and 13D being cross-sectional views, corresponding to that in FIG. 13B, of the state where a micro SD card has been installed, and FIG. 13E being a cross-sectional view, corresponding to that in FIG. 13B, of the state where a micro MM card has been installed.
Figure 13B:
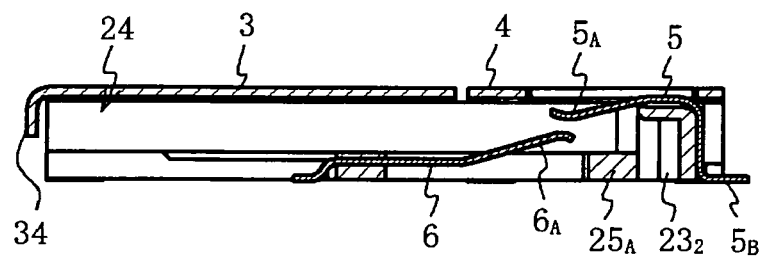
Figure 13C:
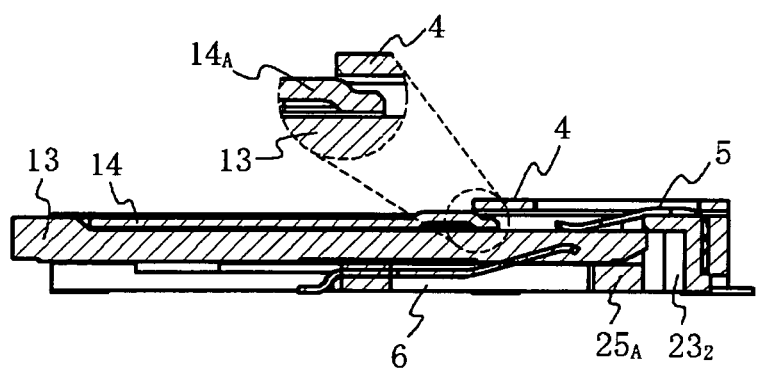
Figure 13D:
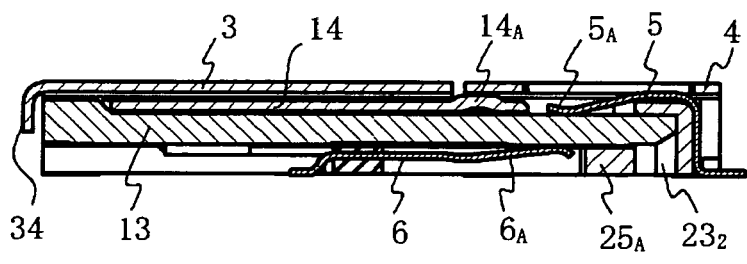
Figure 13E:
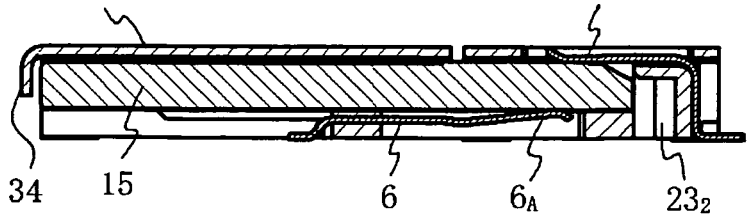

Next will be described, with reference to FIGS. 1 to 13, the procedure for assembling a connector 1 that employs the foregoing parts. First, the first and second contact terminals 5, 6 shown in FIG. 8 are fitted to the housing 2 shown in FIGS. 3 and 4. The first contact terminals 5 are fitted by press-fitting and securing the fixing portions $5_C$ thereof into the mounting slots $23_1$ in the third frame 23 of the housing 2. As a result of such fitting, the contacts $5_A$ of the first contact terminals 5 will be positioned inside the card housing cavity 24, while the connecting portions $5_B$ thereof will be in a state such as to project to the rear of the third frame 23, as shown in FIG. 13B. The second contact terminals 6 are fitted into the mounting slots $25_1$ in the inner bottom plate $25_A$. The second contact terminals 6 are fitted by passing the fixing portions $6_C$ thereof along the back surface of the inner bottom plate $25_A$, and insert-molding the fixing portions $6_C$ through the mounting slots $25_1$ so as to point upward and be secured. As a result of such fitting, the contacts $6_A$ of the second contact terminals 6 will be positioned inside the card housing cavity 24, while the connecting portions $6_B$ thereof will be in a state such as to project to the lower surface of the inner bottom plate $25_A$, as shown in FIG. 13B.

Following that, the first and second switch members shown in FIGS. 9 and 10 are fitted to the first and second switch mounting portions S1, S2 of the housing 2. To fit the first switch member to the first switch mounting portion S1, the movable contact terminal 7 and the fixed contact terminal 8 are inserted into and fixed in mounting slot $21_2$ and mounting slot $21_3$ respectively. Likewise, to fit the second switch member to the second switch mounting portion S2, the movable contact terminal 9 and the fixed contact terminal 10 are inserted into and fixed in mounting slot $21_5$ and mounting slot $21_6$ respectively. Such fitting of the first and second switch members to the first and second switch mounting portions S1, S2 results in the formation of the first and second switch means $SW_1$ and $SW_2$ shown in FIG. 2. More precisely, the first switch means $SW_1$, is formed when the movable contact $7_A$ of the movable contact terminal 7 contacts with the fixed contact $8_A$ of the fixed contact terminal 8, and the projecting curved portion $7_C$ projects inside the card holding cavity 24; while the second switch means $SW_2$, is formed when the movable contact $9_C$ of the movable contact terminal 9 faces, but is separated, i.e. disconnected from, the fixed contact $10_A$ of the fixed contact terminal 10, and the latching protrusion $9_A$ projects outward.

Next, the shield cover 4 shown in FIG. 6 is fitted to the shield cover mounting part ii at the rear of the housing 2. The shield cover 4 is fitted by pushing outward the two opposed sideplates 42, 42, against the resilience thereof, so that the distance therebetween is widened; bringing the two sideplates into contact with the sidewalls $21_D$, $22_D$, of the housing 2, and mating the mating holes $42_1$, $43_1$ of the two sideplates 42, 43 to the latching protrusions $21_P$, $22_P$ on the housing 2, so as to effect fixing. After that, the open-close cover 3 shown in FIG. 5 is fitted to the shield cover 4. To fit the open-close cover 3, the extension portions $32_A$, $33_A$ of the two sideplates of the open-close cover 3 are pushed outward, against the resilience of the two sideplates, and fitting the pivot protrusions $32_1$, $33_1$ provided in the extension portions into the pivoting holes $42_2$ in the shield cover 4 so as to be secured but freely rotatable therein. With the open-close cover 3 thus fitted to the housing 2, the open-close cover 3 can be opened/closed as desired, and when the open-close cover 3 is open, it is possible to examine the interior of the card holding cavity 24, as shown in FIG. 12. After that, the left and right fitting tabs $11_L$, $11_R$ shown in FIG. 11 are fitted into the mounting slots $21_T$, $22_T$ in the bottom of the housing 2, whereupon assembly of the connector 1 is complete. The assembled connector 1 is used by being fitted to a printed wiring board or the like, which is not shown in the drawings.

Next will be described, with reference to FIGS. 1, 2, 12 and 13, the installation of the micro SD and micro MM cards 13, 15 into the card holding cavity 24, and the process of closing the open-close cover 3. First, installation of one of these card types, the micro MM card 15, into the card holding cavity 24 will be described below.

To begin with, before installation of the micro MM card 15, the open-close cover 3 is opened. Opening the open-close cover 3 exposes the interior of the card holding cavity 24, so that the interior is observable. At this point, a check is made by comparing the contacts 15d and positioning protrusion 15c of the micro MM card 15 to be inserted with the array status and hole shapes of the first contact terminals 5 inside the card holding cavity 24. Based on the result of such check, the micro MM card 15 shown in FIG. 1 is oriented with the contacts 15d on the upward face. Should the obverse and reverse faces of the MM card be the wrong way around, they will be changed so that the contacts 15d point upward.

Next, the micro MM card 15's first side edge $15_1$, where the positioning protrusion 15c is provided, and reverse face, are brought into contact with the inner wall face $21_C$ of the first frame 21 and the lateral bottom plate $25_B$ of the card holding cavity 24, respectively, while at the same time the second side edge $15_2$ is brought into contact with the lateral bottom plate $25_C$ and inner wall face $22_C$ of the second frame 22, and the card is inserted. In such insertion process, as the micro MM card 15's leading end portion 15a approaches the aperture $23_2$, the micro MM card 15's first side edge $15_1$, contacts against the projecting curved portion $7_C$ of the movable contact terminal 7 and is pushed outward, the movable contact $7_A$ of the movable contact terminal 7 becomes detached from the fixed contact $8_A$ of the fixed contact terminal 8, and the first switch means $SW_1$ is turned OFF. The fact that the micro MM card 15 has been installed can be sensed electrically via such turning OFF of the first switch means $SW_1$ (see FIG. 2). Thus, when installing the card, it is possible, before insertion, to make a check by comparing the contacts 15d and positioning protrusion 15c of the micro MM card 15 to be inserted with the array status and hole shapes of the first contact terminals 5 inside the card holding cavity 24; so that the card can be installed in an extremely simple manner without any misinstallation.

After the micro MM card 15 has been inserted into the card holding cavity 24, the open-close cover 3 is closed. If the micro MM card 15 has not been inserted up to the correct position at the time of such closing manipulation, the trailing end portion 15b of the micro MM card 15 will spring out to the exterior through the front opening of the card holding cavity 24, as shown in FIG. 12A. As a result, the front cover plate 34 of the open-close cover 3 will strike against the sprung-out portion and it will not be possible to close the open-close cover 3. Hence, incomplete installation of the micro MM card 15 can be sensed in a simple manner via such colliding of the open-close cover 3 with the micro MM card 15. Subsequently, when the micro MM card 15 is inserted up to the regular position, it becomes possible to close the open-close cover 3, and the open-close cover 3 is closed. With open-close cover 3 closed, the front cover plate 34 covers the front opening, so that entry of dust or other foreign matter is prevented.

In tandem with the open-close cover 3 closing manipulation, the second switch means $SW_2$ executes a series of OFF-ON-OFF operations. More precisely, prior to closing of the open-close cover 3, the second switch means $SW_2$ is in the OFF state (see (B1) in FIG. 12B). Then in the initial stage of closing of the open-close cover 3, the inner wall face of the open-close cover 3's sideplate 32 contacts against the latching protrusion $9_A$ of the second switch means $SW_2$, the latching protrusion $9_A$ is pushed inward, and the second switch means $SW_2$ switches from OFF to ON (see (B2) in FIG. 12B). At the same time, the latching protrusion $9_A$ enters into the mating hole $32_2$ provided in the sideplates 32, 33 of the open-close cover 3, locking the open-close cover 3 in the closed state (see (B3) in FIG. 12B).

Next is described the installation of the micro SD card 13 into the card holding cavity 24.

Before the micro SD card 13 is installed inside the card holding cavity 24, a guide member 14 is fitted to the micro SD card 13. To fit the guide member 14, the micro SD card 13 is oriented in the manner shown in FIG. 1, that is, oriented with the contacts 13d located on the underside (reverse face) of the micro SD card 13, and inserted into the guide member 14 from the direction $X_1$ shown in FIG. 7A. In the micro SD card 13 thus fitted with the guide member 14, the first side edge $13_1$ is clasped by the clasp $14_D$, and the other side edge $13_2$ by the opposite-side clasps $14_B$, $14_B$, the latching indent 13e of the micro SD card 13 being latched onto the latching protrusion $14_E$. Furthermore, if the micro SD card 13 is inserted into the guide member 14 from direction $X_2$, or is inserted thereinto with the obverse/reverse face orientation shown in FIG. 1 inverted, that is, with the contacts 13b located on the upward side, from direction $X_1$ or $X_2$, then in any of these cases such insertion will be blocked and the misinstallation will be sensed.

After the micro SD card 13 has been fitted with the guide member 14, the open-close cover 3 is opened and the card is inserted into the card holding cavity 24. Since the interior of the card holding cavity 24 is exposed when the open-close cover 3 is opened, installation of the micro SD card 13 fitted with the guide member 14 is carried out with roughly the same process as for installation of the micro MM card 15. More precisely, the micro SD card 13 is inserted by bringing the side edge $13_1$ on which the positioning protrusion $13_C$ is provided, or more precisely the first sideplate $14_2$ with the guide member 14 fitted, into contact with the inner wall face $21_C$ of the first frame 21, the other second sideplate $14_3$ into contact with the inner wall face $22_C$, and the reverse face into contact with the lateral bottom plate $25_B$ of the card holding cavity 24. During such insertion process, the guide member 14's clasps $14_B$, $14_B$ fit into the guide grooves $25_B$, $25_C$, in the housing 2 and are moved in sliding motion. Also, the guide member 14's guide piece $14_C$ is guided by contacting against the inner wall face $22_C$. As the micro SD card 13's leading end portion 13a approaches the aperture $23_2$, the micro SD card 13's side edge $13_1$ contacts against the projecting curved portion $7_C$ of the movable contact terminal 7 and is pushed outward, so that the movable contact $7_A$ of the movable contact terminal 7 is detached from the fixed contact $8_A$ of the fixed contact terminal 8 and the first switch means $SW_1$ is turned OFF. The fact that the micro SD card 13 has been installed can be sensed electrically via such turning OFF of the first switch means $SW_1$. In this state, the micro SD card 13's leading end portion 13a is inserted inside the aperture $23_2$. When the micro SD card 13's leading end portion 13a is inserted into the aperture $23_2$, the micro SD card 13 is positioned and secured inside the aperture $23_2$. Also, at the same time, the guide member 14's raised portion $14_A$ enters below the shield cover 4, or more precisely, the place where the card holding cavity 24 is covered by the shield cover 4, and contacts against the inner surface of the shield cover 4, thrusting the micro SD card 13 downward. By such thrusting, each of the contacts 13d on the reverse face of the micro SD card 13 is clamped against the contact $6_A$ of the corresponding second contact terminal 6, thus effecting good electrical connection (see FIGS. 13C and 13D). After the micro SD card 13 has been inserted inside the card holding cavity 24, the open-close cover 3 is closed. Such closing manipulation is carried out with the same process as for installation of the micro MM card 15. Thus, the fact that the micro SD card 13 is fitted with the guide member 14 before being installed into the card holding cavity 24 means that despite the gaps occurring inside the card holding cavity 24, the micro SD card 13 will be held in place by the guide member 14, and will not move even if vibration, etc., acts thereon. In this way, poor contacting is eliminated.

The card connector 1, although described in the foregoing embodiment as being for use with a micro SD card 13 and a micro MM card 15, is not limited to being used with such cards.

What is claimed is:

1. A card connector comprising:
   a connector housing constituted of electrically insulative bodies and capable of housing cards of differing size and thickness inside a bottomed card holding cavity which is formed therein so as to be enclosed on three sides by an opposed pair of first and second frames and a third frame that links the end portions of the first and second frames, and so as to be open at the front and top;
   contact terminals that are deposed inside the connector housing's card holding cavity; and
   an open-close cover that covers the openings of the connector housing's card holding cavity;
   the open-close cover has a sensing member for sensing the installation status of a first or second card type installed in the card holding cavity, and the installation status of a first or second card type, when installed into the card holding cavity, is sensed by closing the open-close cover and positioning the sensing member of the open-close cover at the rear end portion of the first or second card type;
   the rear of the open-close cover being rotatably pivoted on the first and second frames.

2. The card connector according to claim 1, wherein, on an upper surface of a guide member's top plate, there is formed a raised portion that, in concert with a shield cover, reinforces the contacting with the second contact terminals.

3. The card connector according to claim 1, wherein the cards include first and second card types, the first card type is formed small compared to the second card type, and a guide member is fitted to the first card type in order to install the first card type into the card holding cavity.

4. The card connector according to claim 1, wherein the cards include first and second card types, the card holding cavity is formed in a shape that permits each of the first and second card types to be housed therein, and the contact terminals include first and second contact terminals that contact with the contacts of the first and second card types respectively.

5. The card connector according to claim 4, wherein the first contact terminals are fixed to the third frame of the connector housing, and the second contact terminals are fixed to the bottom of the connector housing.

6. The card connector according to claim 1, wherein the open-close cover is formed from metal plates comprising a pair of first and second sideplates that cover the outer side surfaces of the first and second frame, a top plate that links the top edges of the sideplates and covers the upper opening of the card holding cavity, and a front cover plate that covers the front opening of the card holding cavity, with the front cover plate serving as the sensing member.

7. The card connector according to claim 1, wherein either the first or the second frame of the connector housing is provided with a first switch means that senses the installation status of the card, and with a second switch means that senses the open-closed status of the open-close cover.

8. The card connector according to claim 7, wherein the first switch means is composed of a first fixed contact terminal having a fixed contact, and a first movable contact terminal having a movable contact that contacts and separates from the fixed contact, together with an actuating part that separates the movable contact from the fixed contact when a card is installed; and the second switch means is composed of a second fixed contact terminal having a fixed contact, and a second movable contact terminal having a movable contact that contacts and separates from the fixed contact, together with an actuating protrusion that separates the movable contact from the fixed contact in interlock with opening/closing manipulation of the open-close cover.

9. The card connector according to claim 8, wherein, in interlock with closing manipulation of the open-close cover, the actuating protrusion of the second movable contact terminal causes the second switch means to execute a series of OFF-ON-OFF operations, and in the final OFF state, the actuating protrusion is latched into a latching hole provided in the frame, thereby locking the open-close cover in the closed state.

10. The card connector according to claim 1, wherein the cards include first and second card types, the first card type is formed long compared to the second card type, and an aperture portion for insertion of the leading end of the first card type is formed in the third frame; so that when a first card type is installed, the leading end of the first card type is inserted into such aperture and thereby is positioned and secured.

11. The card connector according to claim 3, wherein the guide member is formed with a top plate that covers the obverse surface of the leading end portion of such first card type, leaving a part thereof exposed, and with clasps and guide edgings that are bent out from the two side edges of the top plate and clasp the two side edges of the first card type.

12. The card connector according to claim 11, wherein there is formed in the guide member, at a place adjacent to either of the clasps provided on the top plate, a controlling portion that controls the installation orientation of the first card type.

13. The card connector according to claim 1, wherein a shield cover made of metal is fitted onto the rear of the connector housing, the open-close cover is formed from metal material, and the metallic open-close cover is pivoted on the shield cover.

* * * * *

UNITED STATES PATENT AND TRADEMARK OFFICE
CERTIFICATE OF CORRECTION

PATENT NO.        : 7,537,486 B2                                              Page 1 of 1
APPLICATION NO.   : 12/155499
DATED             : May 26, 2009
INVENTOR(S)       : Fan Shin Hong et al.

It is certified that error appears in the above-identified patent and that said Letters Patent is hereby corrected as shown below:

On the Title Page:
Item (75) should read:
-- Fan Shin Hong, Singapore (SG); Weng Heng Liong, Singapore (SG); Shao Yenn Florence Chee, Singapore (SG) --.

Signed and Sealed this

Twenty-eighth Day of July, 2009

JOHN DOLL
*Acting Director of the United States Patent and Trademark Office*